United States Patent
Kerrigan et al.

[19]

[11] Patent Number: 6,141,209
[45] Date of Patent: Oct. 31, 2000

[54] QUICK-RELEASE COMPUTER CHASSIS

[75] Inventors: Brian Michael Kerrigan, Austin; Larry Thomas Cooper, Round Rock; Daniel Paul Beaman, Cedar Park; John Richard Pugley, Round Rock; M. Lawrence Buller, Austin; Jeffrey William Young, Round Rock, all of Tex.

[73] Assignee: International Business Machines Corporation, Armonk, N.Y.

[21] Appl. No.: 09/175,020

[22] Filed: Oct. 19, 1998

[51] Int. Cl.⁷ .............................. H05K 5/00; H05K 7/16; H05K 7/14; A47B 81/00
[52] U.S. Cl. ...................... 361/683; 361/683; 361/686; 361/725; 361/726; 361/787; 361/796; 312/223.2; 312/194; 312/195
[58] Field of Search ................................ 361/726, 725, 361/796, 787, 683, 686; 312/223.2, 194, 195

[56] References Cited

U.S. PATENT DOCUMENTS

D. 397,326  8/1998  Hill et al. ............................... D14/100
5,224,019   6/1993  Wong et al. ............................. 361/393
5,748,442   5/1998  Toor ........................................ 361/685

*Primary Examiner*—Leo P. Picard
*Assistant Examiner*—Tung Minh Bui
*Attorney, Agent, or Firm*—Casimer K. Salys; Felsman, Bradley, Vaden, Gunter & Dillon, LLP

[57] ABSTRACT

A computer has an internal chassis with four wall-like frame members located at its rectangular perimeter. A variety of electronic components are mounted to the chassis within the rectangular perimeter. A bezel is mounted to an outer portion of one of the frame members and forms an exterior rear panel of the computer. The chassis is sidably mounted within an integral, five-sided enclosure having a rectangular opening at its rearward end. The enclosure closely receives the chassis to eliminate relative movement therebetween. The bezel has an integral handle with a pair of tabs which engage recesses in the enclosure when the chassis is in the enclosure. The chassis is removed from the enclosure by lifting the handle on the bezel such that the tabs disengage the recesses in the enclosure to allow the chassis to slide out of the enclosure.

21 Claims, 3 Drawing Sheets

QUICK-RELEASE COMPUTER CHASSIS

TECHNICAL FIELD

This invention relates in general to electronic computers and in particular to an internal computer chassis which is joined to an external housing without the use of fasteners.

BACKGROUND ART

Electronic computers comprise a variety of electronic components such as printed circuit boards, connectors, a ventilation fan and the like. Each of these components is rigidly mounted to an internal frame or chassis which is usually rectangular in shape. A chassis typically comprises a metal base plate and a number of struts or support members extending from the base plate. An external housing or enclosure is removably attached to the chassis for allowing the user access to the components. The enclosure also protects the exposed components from physical contact and reduces electromagnetic interference with the components. The shape of the enclosure generally conforms to the shape of the chassis, such that the computer has six sides comprising a top panel, a bottom panel, two side panels, a front panel and a rear panel.

In the prior art, enclosures are attached to the chassis with a plurality of removable fasteners such as screws or clips. In some cases, disassembly of the enclosure from the chassis can be difficult and time consuming. In addition, the enclosure usually forms no more than four of the six sides. For example, the base plate and rear frame structure of the chassis would form the bottom and rear panels of the computer, respectively, while the walls of the enclosure form the front, top and side panels.

In addition, the power supply must be capable of being removed as a field replaceable unit. Unfortunately, the riser card in the computer is typically mounted directly to the power supply through stand-offs with at least two screws. These screws are difficult to access and require the riser card and system feature (PCI) cards to be removed as well. Thus, it is somewhat difficult to service the power supply in these units. Although these designs are workable, an improved chassis and enclosure design is desirable.

DISCLOSURE OF THE INVENTION

A computer has an internal chassis with four wall-like frame members located at its rectangular perimeter, including a rear panel of the computer. A variety of electronic components are mounted to the chassis within the rectangular perimeter. A bezel is mounted to an outer portion of the rear panel. The chassis is slidably mounted within an integral, five-sided enclosure having a rectangular opening at its rearward end. The enclosure closely receives the chassis to eliminate excessive movement therebetween. The bezel has an integral handle with a pair of tabs which engage recesses in the enclosure when the chassis is inserted into the enclosure. The chassis is removed from the enclosure by lifting the handle on the bezel such that the tabs disengage the recesses to allow the chassis to slide out of the enclosure.

BEST MODE FOR CARRYING OUT THE INVENTION

Figure 1:
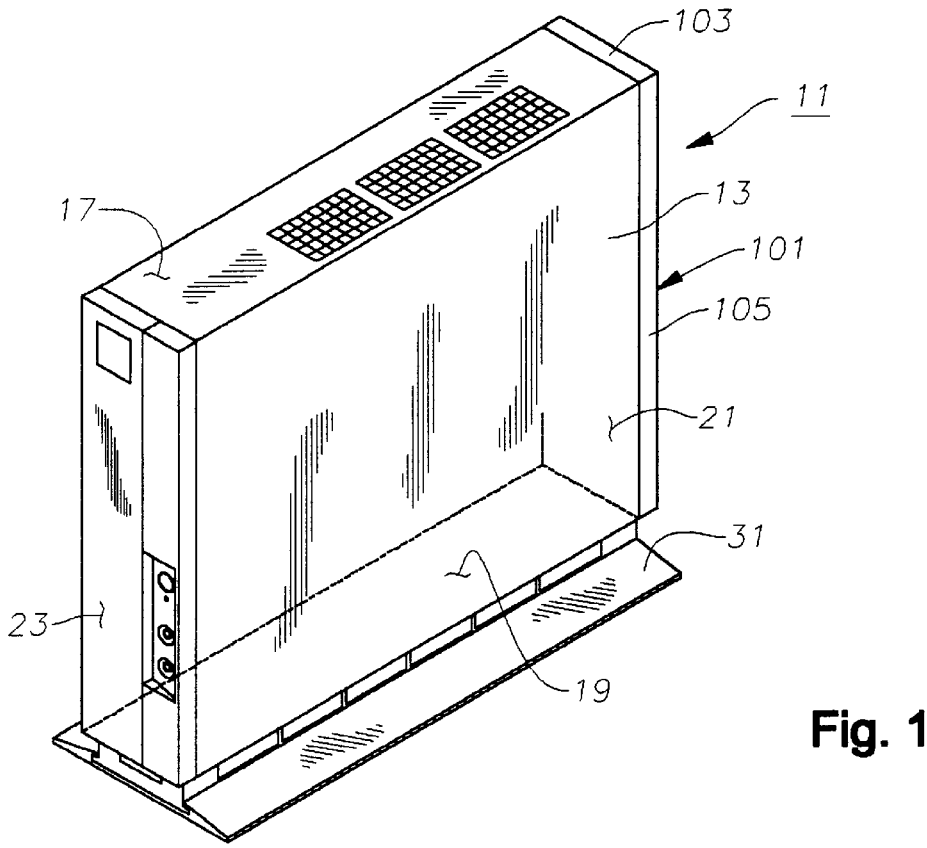
FIG. 1 is a front isometric view of a computer constructed in accordance with the invention.
Figure 2:
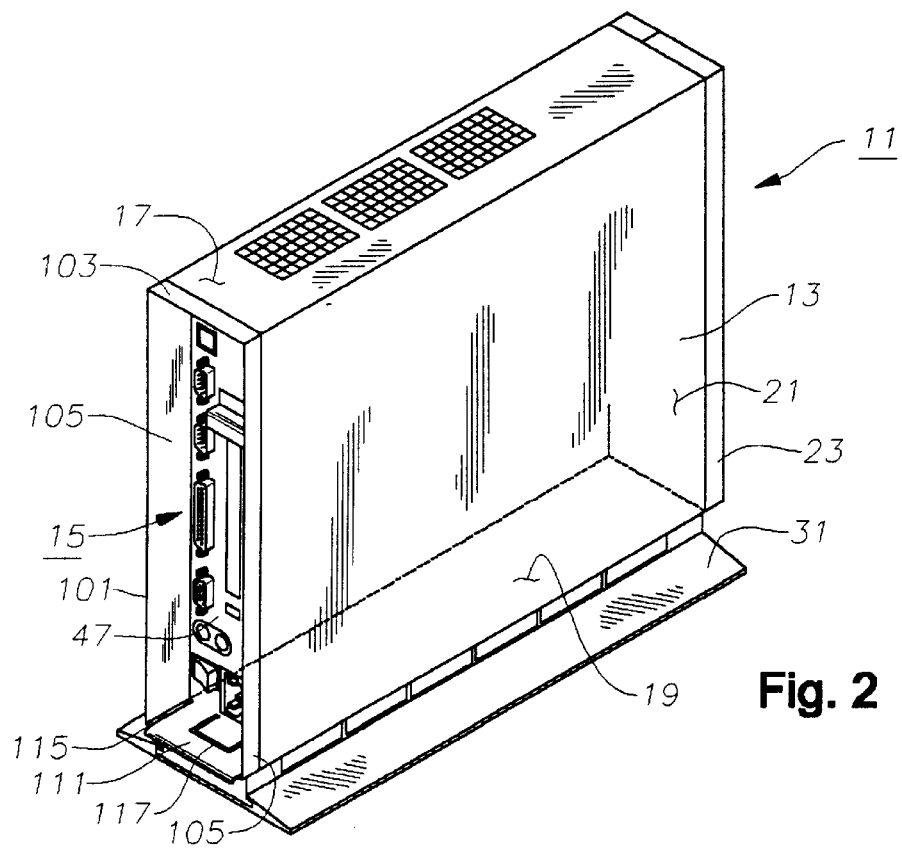
FIG. 2 is a rear isometric view of the computer of FIG. 1.

Referring to FIGS. 1 and 2, a network computer 11 is shown. Computer 11 has an external metal housing or enclosure 13 and an internal metal frame or chassis 15. Enclosure 13 is essentially a five-sided rectangular box with an opening on a rearward end. Enclosure 13 has a top panel 17, a bottom panel 19, and two side panels 21, all of which are formed from a single sheet of metal which is bent to form four corners. A front panel 23 is integrally joined to the forward end of enclosure 13. A base or pedestal 31 is mounted to the lower surface of bottom panel 19.

Figure 3:
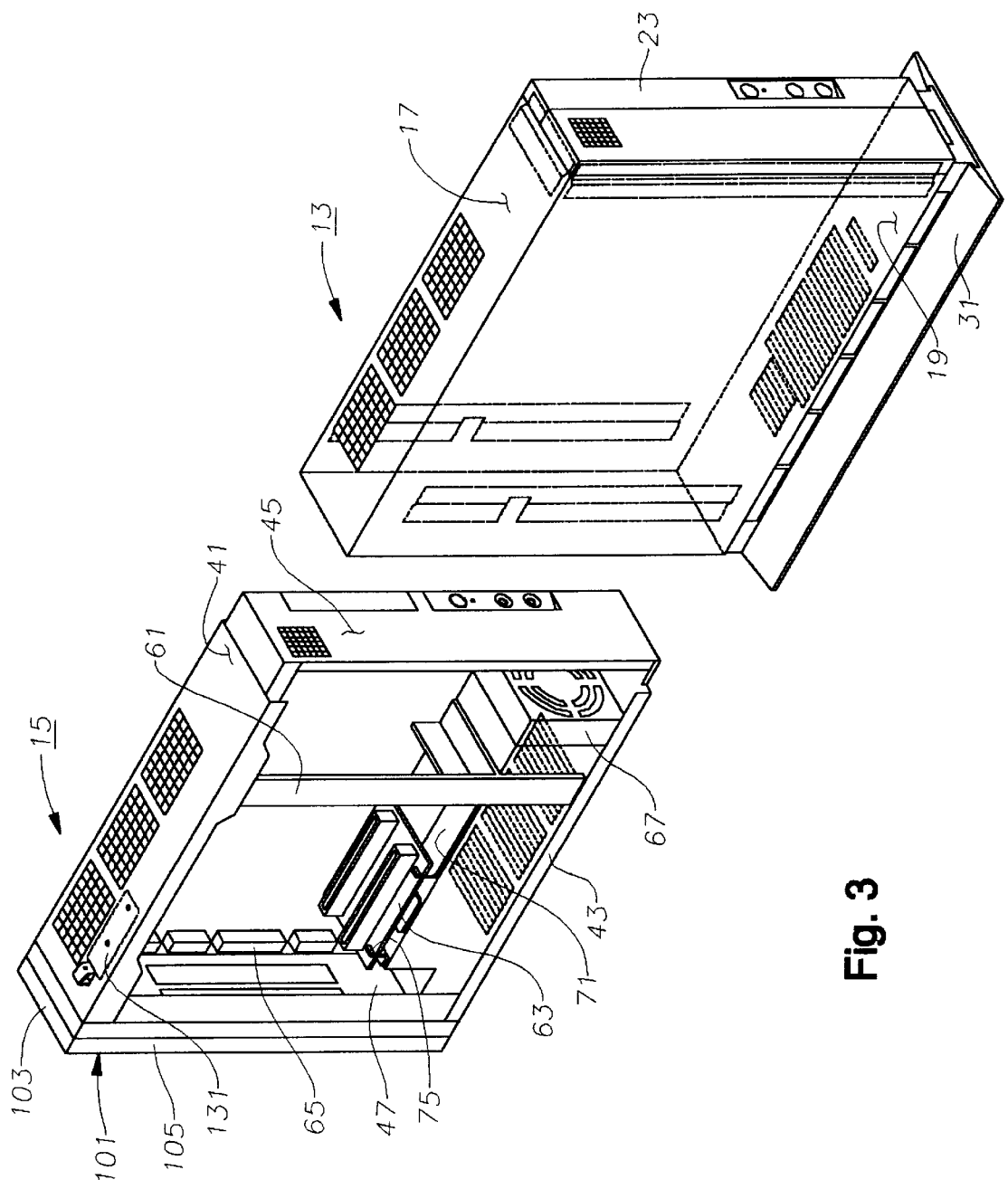
FIG. 3 is a front isometric, partially transparent view of the computer of FIG. 1 shown with its chassis removed from its enclosure.
Figure 4:
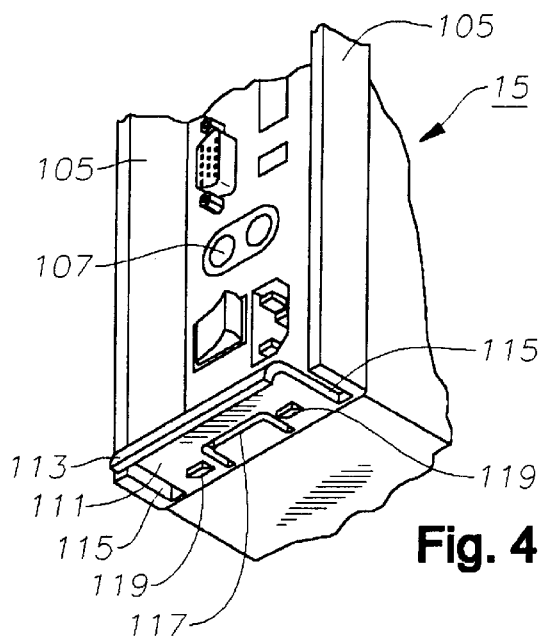
FIG. 4 is a lower isometric view of a rearward portion of the chassis of FIG. 3.

As shown in FIG. 3, chassis 15 is slidably mounted within enclosure 13. Chassis 15 has a rectangular perimeter of four wall-like frame members including a top 41, a bottom 43 and front and rear ends 45, 47. This configuration allows the vertical sides of chassis 15 to remain open and uncovered. A strut 61 is mounted and extends vertically between top 41 and bottom 43. Chassis 15 also has a plurality of electronic components such as a power supply 60, printed circuit boards 63 (one shown), connectors 65, a ventilation fan 67 and the like mounted to it. For simplicity, only a few of the components of computer 11 are illustrated.

Figure 7:
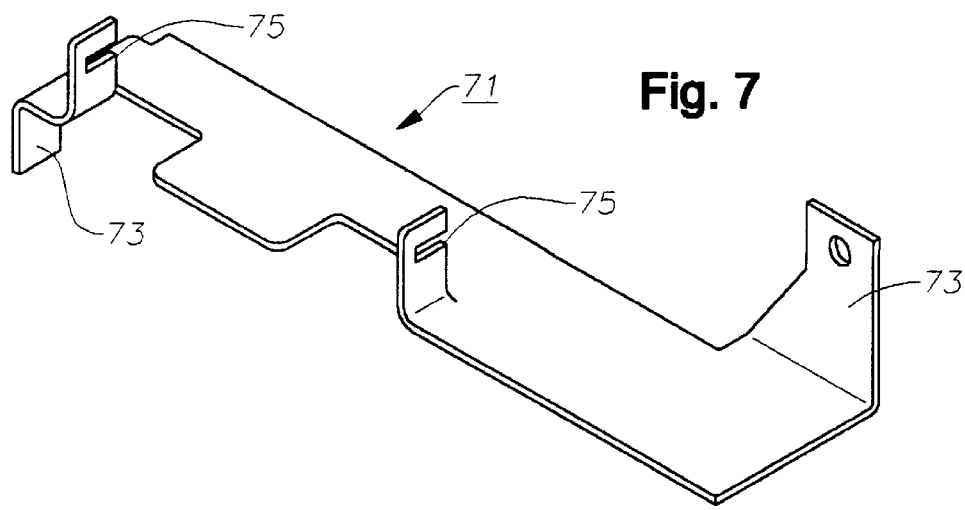
FIG. 7 is an isometric view of a riser support bracket of the computer of FIG. 1.

In the embodiment shown, printed circuit board 63 is a riser card which is supported by a uniquely configured riser support bracket 71 (FIGS. 3 and 7). Bracket 71 is a generally flat rectangular member with mounting portions 73 which are fastened to power supply 60 and card support slots 75. Slots 75 interlock with mating slots along the edge of the riser card 63 and do not require fasteners.

Referring now to FIGS. 1 and 3–5, a plastic bezel 101 is permanently mounted to rear end 47 of chassis 15. Bezel 101 essentially forms a border around rear end 47. Bezel 101 has a rectangular frame-like structure with a horizontal top panel 103, two vertical, parallel side panels 105 and a vertical front panel 107 with various openings for accommodating elements and features on rear end 47. Front panel 107 is generally perpendicular to panels 103, 105.

Figure 5:
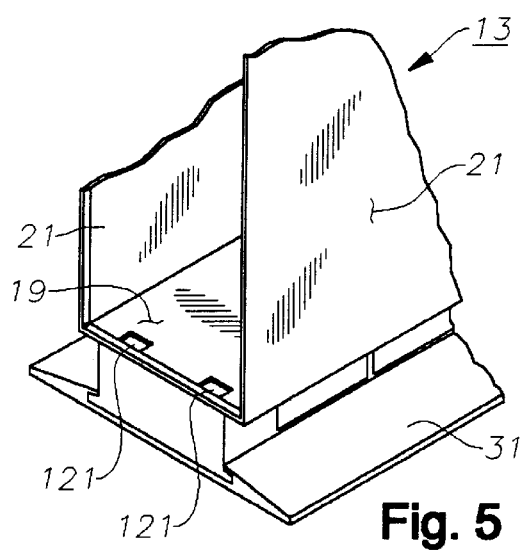
FIG. 5 is an upper isometric view of a rearward portion of the enclosure of FIG. 3.

A latch or handle 111 extends horizontally from a lower end of front panel 107. A downward-turned rib 113 (FIG. 4) spans the width of handle 111 at its distal end for improved grip. Handle 111 is separated from side panels 105 by a pair of horizontal slots 115 so that it may pivot vertically about its interface with front panel 107. A U-shaped slot 117 is provided near the center of the interface between handle 111 and front panel 107 to increase the flexibility of handle 111. Handle 111 also has a pair of downward-protruding tabs 119 located on either side of U-shaped slot 117. As shown in FIG. 5, enclosure 13 has a pair of rectangular keepers or recesses 121 which are spaced-apart from each other near the rearward edge of bottom panel 19.

Figure 6:
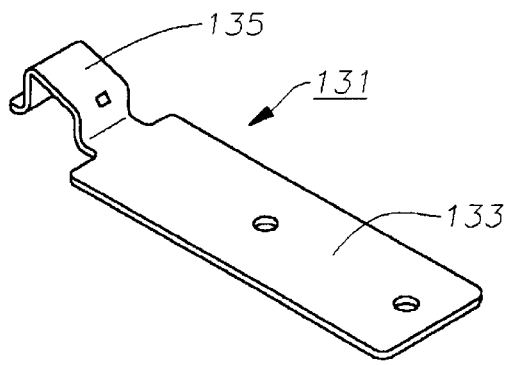
FIG. 6 is an isometric view of a safety latch of the computer of FIG. 1.

As shown in FIGS. 3 and 6, a safety latch 131 is mounted in top 41. Safety latch 131 has a flat mounting portion 133 which is fastened to a lower surface of top 41, and a spring tab 135 which extends upward through a very small hole 137 in top 41. When chassis 15 is removed from enclosure 13, tab 135 extends above the upper surface of top 41. When chassis 15 is installed in enclosure 13, tab 135 is pivoted downward and depressed into the hole 137 in top 41.

In operation, enclosure 13 closely receives chassis 15 such that top panel 17 and bottom panel 19 slidably abut top 41 and bottom 43. In addition, the vertical side edge portions of top 41 and bottom 43 slidably engage side panels 21 to eliminate excessive movement between chassis 15 and enclosure 13. When chassis 15 is almost completely inserted into enclosure 13, tab 135 on safety latch 131 abuts the rearward edge of top panel 17 and interrupts further entry of chassis 15 into enclosure 13. Tab 135 must be depressed so that chassis 15 can continue forward movement into enclosure 13. After tab 135 is depressed, tabs 119 on handle 111 contact the rearward edge of bottom panel 19 and ride up onto the inner surface of bottom panel 19, thereby causing handle 111 to flex slightly upward. Continued forward movement of chassis 15 into enclosure 13 and the resiliency of handle 111 will cause tabs 119 to snap down into recesses 121 once chassis 15 is fully inserted into enclosure 13. At this point, bezel 101 abuts enclosure 13 and chassis 15 is locked from movement and removal from enclosure 13.

Chassis 15 may be removed from enclosure 13 by gently lifting handle 111 at rib 113 so that tabs 119 disengage recesses 121. Chassis 15 is then slidably removed from enclosure 13 by pulling in a rearward direction on handle 111 and bezel 101 while handle 111 is lifted. Tab 135 on safety latch 131 pops up after it passes the rearward edge of top panel 17.

Power supply 60 may be serviced by unscrewing the fasteners which secure bracket 71 to power supply 60. Slots 75 in bracket 71 then slide off of the mating slots in riser card 63 and the power supply 60 can be easily removed from chassis 15.

The invention has several significant advantages. No separate mechanical fasteners are required to attach or remove the chassis from the enclosure. The chassis is slidably retained within the enclosure with a single quick-release handle located at the rear of the computer. This feature allows fast and easy access to the components of the computer without the use of tools. In addition, the enclosure forms five integrated sides of the six sides of the computer to better protect the computer from electromagnetic interference. The riser support bracket is designed to allow quick and easy access to the power supply so that it may be serviced as a field replaceable unit.

While the invention has been shown or described in only some of its forms, it should be apparent to those skilled in the art that it is not so limited, but is susceptible to various changes without departing from the scope of the invention.

What is claimed is:

1. A computer, comprising:
   a generally rectangular computer enclosure having an opening on one end;
   a computer chassis having a rectangular perimeter which is closely received by the opening in the enclosure and slidably mounted in the enclosure;
   a plurality of electronic components mounted to the chassis within the perimeter;
   a keeper on one of the chassis and the enclosure;
   a latch on the other of the chassis and the enclosure for engaging the keeper when the chassis is mounted within the enclosure; and wherein
   the chassis is removable from the enclosure by moving the latch to disengage the keeper and sliding the chassis out of the opening in the enclosure.

2. The computer of claim 1 wherein the enclosure is a five-sided box.

3. The computer of claim 1 wherein the opening is at a rearward end of the enclosure.

4. The computer of claim 1, further comprising a bezel mounted to an outer portion of the chassis, and wherein the latch is mounted to the bezel which abuts the enclosure when the chassis is mounted within the enclosure.

5. The computer of claim 1 wherein the latch is a pivotable handle with a tab and the keeper is a recess for receiving the tab.

6. The computer of claim 4 wherein the bezel forms a border around an exterior rear panel of the chassis.

7. A computer, comprising:
   a generally rectangular enclosure having an opening on one end;
   a chassis having a rectangular perimeter which is closely received by the opening in the enclosure and slidably mounted in the enclosure;
   a plurality of electronic components mounted to the chassis within the perimeter;
   a keeper on one of the chassis and the enclosure;
   a latch on the other of the chassis and the enclosure for engaging the keeper when the chassis is mounted within the enclosure;
   a power supply mounted to the chassis;
   a riser support bracket fastened to the power supply;
   a riser card slidably coupled to the riser support bracket to enable removal of the riser card from the bracket without unscrewing any fasteners; and wherein the chassis is removable from the enclosure by moving the latch to disengage the keeper and sliding the chassis out of the opening in the enclosure.

8. A computer, comprising:
   a generally rectangular enclosure having an opening on one end;
   a chassis having a rectangular perimeter which is closely received by the opening in the enclosure and slidably mounted in the enclosure;
   a plurality of electronic components mounted to the chassis within the perimeter;
   a keeper on one of the chassis and the enclosure;
   a latch on the other of the chassis and the enclosure for engaging the keeper when the chassis is mounted within the enclosure; and wherein
   the chassis is removable from the enclosure by moving the latch to disengage the keeper and sliding the chassis out of the opening in the enclosure; and further comprising:
      a safety stop mounted to one of the chassis and the enclosure for interrupting sliding movement of the chassis into the enclosure prior to the keeper engaging the latch, the safety stop being movable to a released position to allow continued movement of the chassis into the enclosure.

9. The computer of claim 8 wherein the safety stop is a spring member which is pivotably mounted to the chassis.

10. A computer, comprising:
    a generally rectangular, five-sided enclosure having an opening on one end;
    a chassis having four frame members which form a generally rectangular perimeter, the chassis being closely received by the opening in the enclosure and slidably mounted in the enclosure;

a plurality of electronic components mounted to the chassis within the perimeter;

a recess on one of the chassis and the enclosure;

a pivotable latch having a tab and located on the other of the chassis and the enclosure for engaging the recess to retain the chassis within the enclosure; and wherein the chassis is removable from the enclosure by moving the latch to disengage the keeper and sliding the chassis out of the opening in the enclosure.

11. The computer of claim 10 wherein the opening in the enclosure is located at a rearward end.

12. The computer of claim 10, further comprising a bezel mounted to an outer portion of the chassis, and wherein the latch is integrally formed with the bezel which abuts the enclosure when the chassis is mounted within the enclosure.

13. The computer of claim 12 wherein the bezel forms a border around a rear panel of the chassis.

14. A computer, comprising:

a generally rectangular, five-sided enclosure having an opening on one end;

a chassis having four frame members which form a generally rectangular perimeter, the chassis being closely received by the opening in the enclosure and slidably mounted in the enclosure;

a plurality of electronic components mounted to the chassis within the perimeter;

a recess on one of the chassis and the enclosure;

a pivotable latch having a tab and located on the other of the chassis and the enclosure for engaging the recess to retain the chassis within the enclosure;

a power supply mounted to the chassis;

a riser support bracket fastened to the power supply; and a riser card slidably coupled to with the riser support bracket to enable removal of the riser card from the bracket without unscrewing any fasteners; and wherein the chassis is removable from the enclosure by moving the latch to disengage the keeper and sliding the chassis out of the opening in the enclosure.

15. A computer, comprising:

a generally rectangular, five-sided enclosure having an opening on one end;

a chassis having four frame members which form a generally rectangular perimeter, the chassis being closely received by the opening in the enclosure and slidably mounted in the enclosure;

a plurality of electronic components mounted to the chassis within the perimeter;

a recess on one of the chassis and the enclosure;

a pivotable latch having a tab and located on the other of the chassis and the enclosure for engaging the recess to retain the chassis within the enclosure; and wherein the chassis is removable from the enclosure by moving the latch to disengage the keeper and sliding the chassis out of the opening in the enclosure; and further comprising:

a safety stop mounted to one of the chassis and the enclosure for interrupting sliding movement of the chassis into the enclosure prior to the keeper engaging the latch, the safety stop being movable to a released position to allow continued movement of the chassis into the enclosure.

16. The computer of claim 15 wherein the safety stop is a spring member which is pivotably mounted to the chassis.

17. A method of removing a computer chassis from a computer enclosure, comprising:

(a) providing a keeper on one of the enclosure and the chassis, and a latch on the other of the enclosure and the chassis, such that the latch engages the keeper when the chassis is mounted within the enclosure;

(b) moving the latch out of engagement with the keeper; and then (c) sliding the chassis out of an opening in the enclosure, the chassis having a rectangular perimeter which is closely received by the opening in the enclosure.

18. The method of claim 17 wherein step (b) comprises pivoting a handle on the chassis such that a tab on the handle disengages a recess in the enclosure.

19. The method of claim 17, further comprising steps of:

providing a power supply, a riser card and a riser support bracket therebetween in the computer;

removing the power supply from the computer by unscrewing the riser support bracket from the power supply and slidably releasing the riser card from the riser support bracket.

20. The method of claim 17, further comprising the step of reinstalling the chassis in the enclosure by sliding the chassis into the enclosure until the latch reengages the keeper.

21. The method of claim 20, further comprising the step of actuating a safety latch prior to engagement between the latch and the keeper.

* * * * *